March 27, 1934. I. BLECHMAN Re. 19,120

CLOTHING CONTAINER

Original Filed Oct. 24, 1931

WITNESSES

Geo. V. Mayer

Albert Helack

INVENTOR

Irving Blechman

BY Munn & Co.

ATTORNEYS

Reissued Mar. 27, 1934

Re. 19,120

UNITED STATES PATENT OFFICE 19,120

CLOTHING CONTAINER

Irving Blechman, New York, N. Y.

Original No. 1,895,406, dated January 24, 1933, Serial No. 570,931, October 24, 1931. Application for reissue November 18, 1933, Serial No. 698,727

9 Claims. (Cl. 206—10)

The present invention relates to containers for the storage of clothing to protect the same against attack by moths or other insects, and has as an object the provision of a container of this character employing a volatile substance as an insecticide or insect repellent, and so constructed that fumes from the said substance will permeate the clothing chamber but that clothing therein will be protected against direct contact with said substance.

Another object of the invention is the provision of a container of this character formed with an absorbent medium for receiving a volatile insecticide or insect repellent, and with a substantially non-absorbent material separating the said absorbent medium from the clothing chamber.

The invention also includes as an object, the provision of a collapsible clothing container having a medium saturated with an insecticide or an insect repellent arranged in position therein, so that all parts of the said container may be collapsed to substantially flat condition.

The invention also resides in the novel features of construction and arrangement of parts which will be more fully described and claimed hereinafter.

The invention is illustrated in the accompanying drawing, in which

Figure 1:
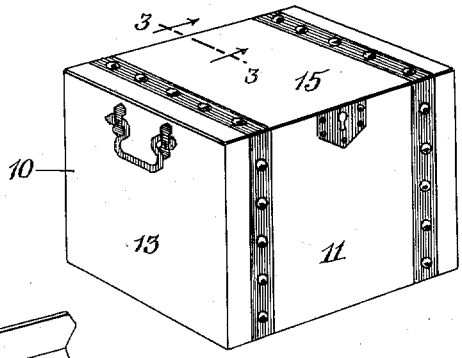
Fig. 1 is a perspective view of a container embodying the invention.
Figure 3:
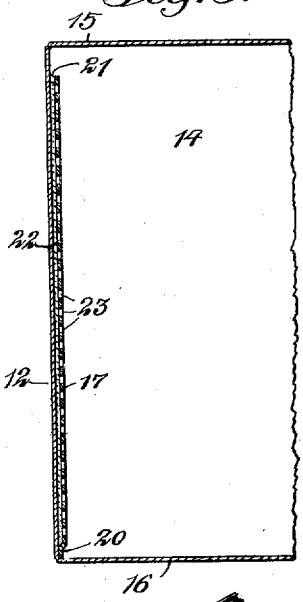
Fig. 3 is a vertical sectional view of a portion of the container, on the line 3—3 of Fig. 1.
Figure 2:
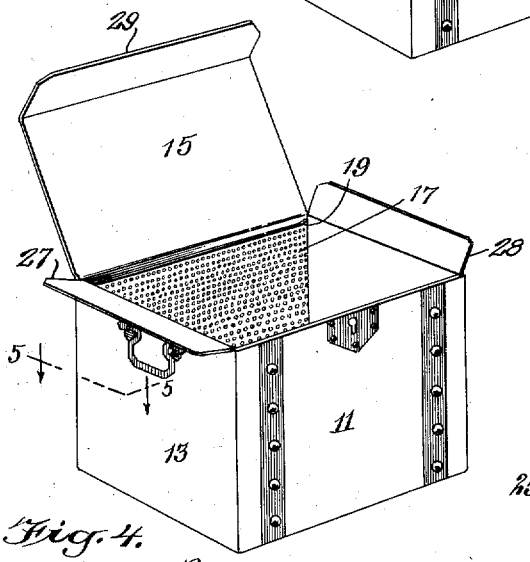
Fig. 2 is a perspective view of the container shown in Fig. 1, with the lid in open position, showing a foraminous wall on the inside of the container.
Figure 7:
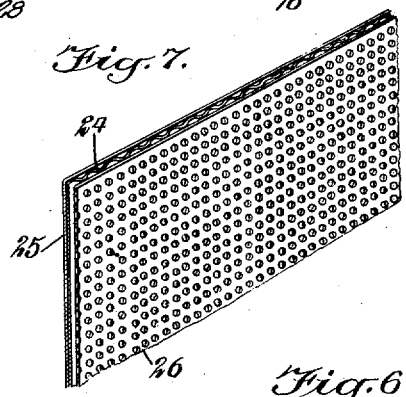
Fig. 7 is a perspective view of a portion of one of the walls of a modified form of the invention.
Figure 4:
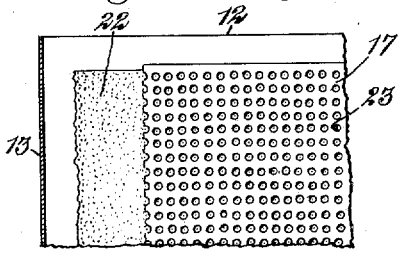
Fig. 4 is an enlarged view in elevation of a portion of the rear wall, with a portion of the foraminous wall broken away to show the insecticide or insect repellent impregnated medium.
Figure 6:
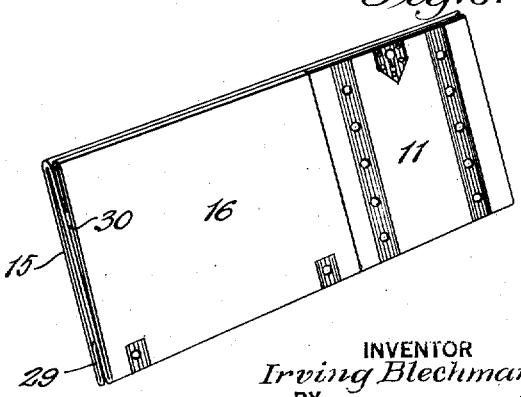
Fig. 6 is a view in elevation of the container in collapsed condition.
Figure 5:
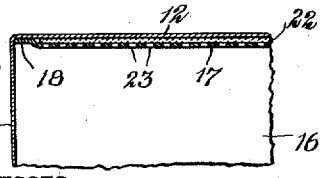
Fig. 5 is a sectional view of a portion of the container on the line 5—5 of Fig. 2.

The container 10, illustrating the said invention, has the form of the usual cedar chest for the storage of clothing, consisting of front and rear walls 11 and 12, side walls 13 and 14, and top and bottom walls 15 and 16. The said walls may be constructed of a single thickness of material as shown in Figs. 2 to 5 inclusive, or of several thicknesses of material as shown in Fig. 7. Preferably, the container is made of material such as cardboard, which is foldable at the corners so that it may be collapsed with all parts arranged in a substantially flat condition as shown in Fig. 6. To collapse the container to the flat condition shown in Fig. 6 the lide or top wall 15 and the bottom wall 16 are opened and the end wall 13 and the front wall 11 are moved against the rear wall 12 and the end wall 14 respectively, with the flaps 27 and 28 folded inwardly between the said walls. The top wall 15 is folded rearwardly against the outer face of the rear wall 12 and with the end flap 29 of the top wall 15 folded between the said top and rear walls, and the bottom wall 16 is folded forwardly upon the side wall 13 and with the end flap 30 folded between the said bottom and side walls. Constructed in this manner the container may be sold with an insecticide or insect repellent arranged in position therein, and when expanded into set up condition it is ready for the storage of clothing. On the inside of the container provision is made for the reception of an insecticide or insect repellent saturated medium which is separated from the clothing chamber by a foraminous wall to prevent direct contact of the clothing therewith.

As shown in Figs. 2 to 5 inclusive one or more of the walls of the container, such for instance, as the rear wall 12, is provided with a wall 17 secured along its side edges 18 and 19 and along its bottom edge 20, to the said rear wall, by any desired means, to form a pocket 21 with the said wall, for the reception of a pad 22 of absorbent material such as felt, which is saturated with a volatile insecticide or insect repellent. The said wall is provided over substantially its entire surface with small openings 23 to permit vapors of the insecticide or insect repellent to permeate the clothing chamber. The openings 23 are relatively small as hereinbefore described, so that the garments will not come in contact with the pad at the openings. Preferably, the wall 17 is made of non-absorbent material, which will not take up or absorb the insecticide or insect repellent in the pad, thus eliminating the danger of soiling the garments in the container, by seepage of the insecticide or insect repellent through the wall and into contact with the garments.

If desired, one or more walls of the container may be made of a plurality of plies of material with an absorbent medium 24 saturated with an insecticide or insect repellent and arranged between the outer ply 25 and the inner foraminous ply 26 as shown in Fig. 7. In this construction the said plies 25 and 26 are preferably made of substantially non-absorbent material which will not readily absorb the insecticide or insect repellent.

The said container may be provided with a lock, handle and reinforcing straps, or representations of the same may be painted thereon to simulate the appearance of the usual cedar chest.

As hereinbefore described, the container is foldable into compact collapsed condition and for this purpose the walls are flexibly connected together at the edges. When in such collapsed condition the insecticide or insect repellent arranged in the pocket 21 or between the plies 25 and 26 is completely housed or enclosed by the folding of the sides of the container upon the foraminous walls 23 or upon the foraminous wall 26, thereby preventing the escape of the vapors of the insecticide or insect repellent. In this manner the said container may be sold in collapsed condition with the insecticide or insect repellent arranged in position therein, the container being ready for use when expanded into set up condition.

The insecticide or insect repellent is preferably a volatile liquid such as cedar oil or pine oil; the absorbent medium may, however, be impregnated with a volatile solid such as gum camphor or naphthalene by heating the said solids to reduce the same to a liquid state and saturating the absorbent material with the heated liquid.

I claim:

1. A collapsible container for clothing including side walls and top and bottom walls flexibly connected together at certain of their edges to permit the folding of said container into substantially flat arrangement, the said walls when in set up condition forming a chamber for the reception of clothing, one of said walls having a foraminous sheet secured thereto, an absorbent medium impregnated with a volatile insecticide material arranged between the said foraminous sheet and the said wall, the said sheet and the said absorbent medium being arranged in close relationship with the said wall, whereby the said container may be collapsed with all parts in substantially compact arrangement.

2. A collapsible container for clothing including side walls and top and bottom walls flexibly connected together at certain of their edges to permit the folding of said container in substantially compact condition, said walls when in set up condition forming a chamber for the reception of clothing, a foraminous partition arranged within the said container, an absorbent pad impregnated with a volatile insecticide material arranged on one side of said foraminous partition and separated from the clothing chamber by the said partition, said absorbent pad being completely enclosed by the container walls when in collapsed condition, to prevent the escape of the vapors of said material.

3. A collapsible cardboard container for clothing including side walls, each of said side walls being flexibly connected to its adjacent side walls, top and bottom walls, each of said top and bottom walls being flexibly connected to a side wall to permit the folding of said walls in substantially compact flat condition, said walls when in set up condition forming a chamber for the reception of clothing, and a volatile insecticide material arranged flatwise against the inner face of one of said walls, said insecticide material being completely covered by the container walls when the container is in collapsed condition to prevent the escape of the vapors of said insecticide material.

4. A collapsible container for clothing including side walls and top and bottom walls flexibly connected together at certain of their edges to permit the folding of said container in substantially compact condition, said walls when in set up condition forming a chamber for the reception of clothing, a foraminous partition arranged within the said container, and an absorbent pad impregnated with a volatile insecticide material arranged on one side of said foraminous partition and separated from the clothing chamber by the said partition, the openings in said foraminous partition being covered by the container walls when in collapsed condition to prevent the escape of the vapors of said insecticide material.

5. In combination, a collapsible container for the storage of clothing, including a plurality of walls, so interconnected as to fold into a flat compact arrangement, means defining a pocket carried by the inner surface of one of said walls, having communication with the interior of the container, disposed in a plane parallel with said wall and of such a size as to lie between the container walls when they are folded into said flat compact arrangement, and a volatile substance within said pocket from which vapors are emitted into the container when in set up condition.

6. In combination, a collapsible container for clothing, including a plurality of walls hingedly connected together at certain of their edges to fold into a flat compact arrangement, means defining a thin foraminous pocket carried by the inner surface of one of said walls and arranged in close relationship with said wall so as to lie between the container walls when folded into said flat compact arrangement, and a volatile insect repellent material arranged in said pocket to emit vapors thereof through the openings in said pocket into the container when in set up relation.

7. In combination, a collapsible container for the storage of clothing, including a plurality of walls flexibly connected together at certain of their edges to permit the folding thereof into a flat compact arrangement, a sheet of foraminous material carried by the inner surface of one of said walls and defining therewith a pocket disposed in a plane parallel with said wall to lie between the container walls when folded into said flat compact arrangement, and a volatile insect repellent substance arranged in said pocket.

8. The combination with a collapsible container for clothing, including a pair of side walls and front and rear walls hingedly connected together at certain of their edges to permit the folding thereof to substantially flat compact condition, a foraminous partition carried by one of said walls providing a pocket and so located as to lie between the said walls when the walls are folded into said flat compact arrangement and a substance contained in said pocket in flat contact with said partition adapted to emit insect repellent vapors through the openings in said partition into the clothing chamber when the same is in set up condition.

9. In combination, a collapsible container for the storage of clothing including a plurality of walls so interconnected as to fold into a flat compact arrangement, and means carried by the inner surface of one of said walls defining a pocket for a volatile insect repellent substance, said pocket having communication with the interior of the container and being disposed in a plane parallel with said wall and of such size as to lie between the container walls when they are folded into said flat compact arrangement.

IRVING BLECHMAN.